(No Model.) 2 Sheets—Sheet 2.

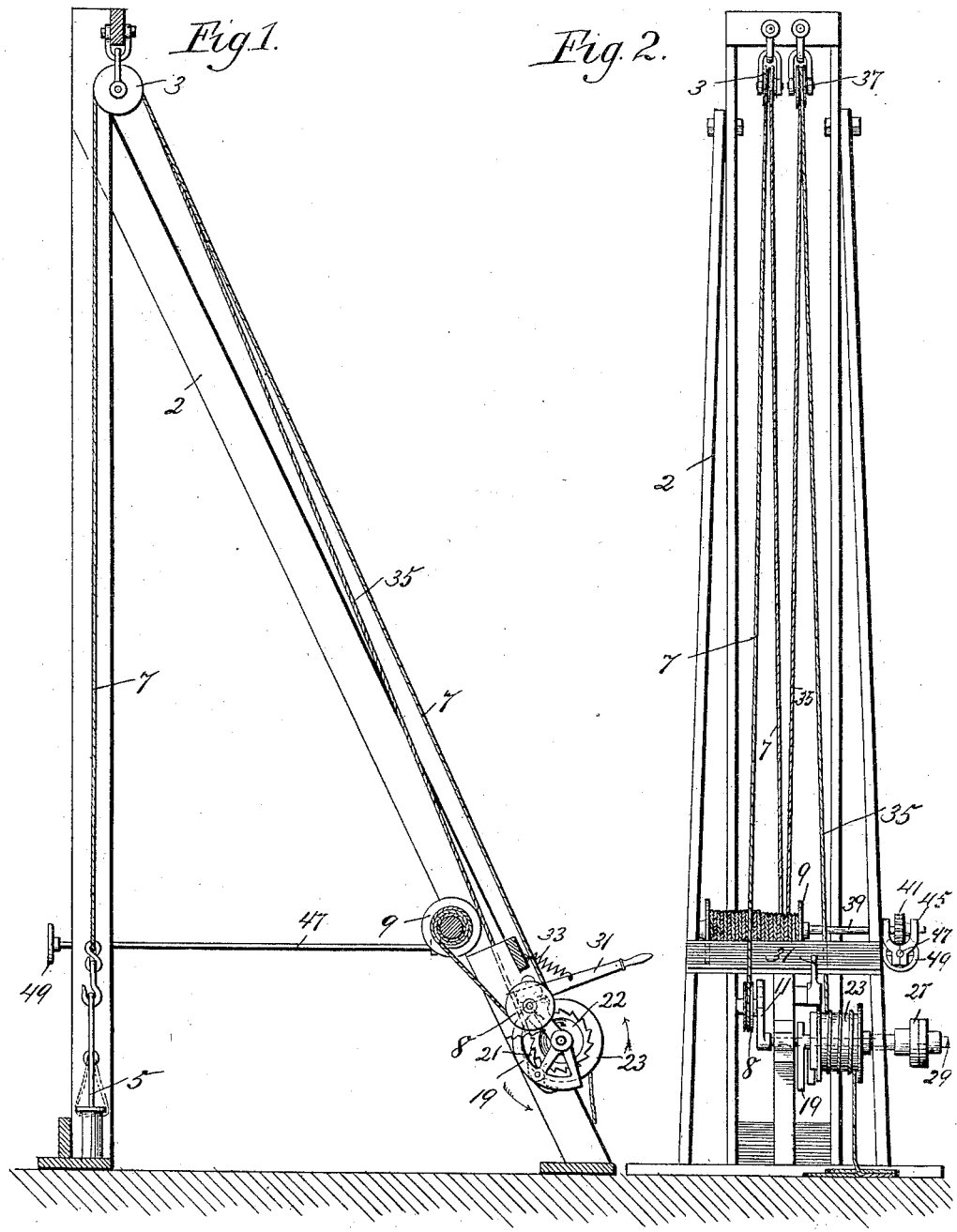

A. C. KRASSIN & T. BOUCHER.
WELL DRILLING MACHINE.

No. 452,878. Patented May 26, 1891.

Witnesses:
a. m. Gaskill
J. Jensen

Inventors:
August C. Krassin
Thomas Boucher

Paul ~~~~~

UNITED STATES PATENT OFFICE.

AUGUST C. KRASSIN AND THOMAS BOUCHER, OF WASECA, MINNESOTA.

WELL-DRILLING MACHINE.

SPECIFICATION forming part of Letters Patent No. 452,878, dated May 26, 1891.

Application filed May 26, 1890. Serial No. 353,125. (No model.)

*To all whom it may concern:*

Be it known that we, AUGUST C. KRASSIN and THOMAS BOUCHER, of Waseca, in the county of Waseca and State of Minnesota, have invented certain Improvements in Well-Drilling Machines, of which the following is a specification.

Our invention relates to improvements in well-drilling machines; and it consists, generally, in the construction and combination hereinafter described, and particularly pointed out in the claims.

In the accompanying drawings, forming a part of this specification, Figure 1 is a side elevation of our improved machine. Fig. 2 is a front elevation of the same. Fig. 3 is a detached view to more clearly show the operating mechanism. Fig. 4 is a section on line *x x* of Fig. 3. Fig. 5 is a detached view of the feed mechanism.

In the drawings, 2 represents the frame of the machine, of any suitable construction. A sheave or pulley 3 is preferably located at or near the upper extremity of this frame and in vertical line with the drill or plunger 5. A rope or cable 7, attached to the said plunger, passes over the sheave 3 and downward around the crank-pulley 8 in the ordinary manner, and is secured upon the spool or windlass 9. The crank-pulley 8 is preferably pivotally secured to the crank 11 by a suitable axis 13, upon which it revolves. The crank 11 is secured to a shaft 15, one end of which is preferably supported in bearings 16 upon the frame 2, and the opposite end is received within a hollow shaft 17 and revolves freely therein. A quadrant 19 is preferably secured to the shaft 15 and revolves therewith. A pawl 21 is preferably located upon the inner surface of the segment of the quadrant 19. One end of this pawl engages a ratchet 22 on the winch 23. The opposite end of the said pawl extends back over the pivotal point and beyond the periphery of said quadrant and forms a lever for throwing it out of engagement with the ratchet. The winch 23 is secured to the hollow shaft 17, and a bearing 25 may be located upon the frame 2 in order to properly support this shaft. We prefer to provide a suitable coupling 27, one end of which is secured to the hollow shaft 17 and the opposite end to the driving-shaft 29. A knuckle or gimbal joint may be used at this point in order to vary the line of the shaft. A lever 31 may be pivoted to a suitable portion of the frame 2 and extend outward therefrom in a line vertical with the pawl 21. We prefer to provide some suitable means, as a spring 33, for holding this lever out of engagement with the free end of the said pawl. When the lever 31 is forced downward to a point in line with the periphery of the quadrant 19, it will strike the free end of the pawl and throw it out of engagement with the ratchet, which allows the winch to revolve, while the crank 11 and its shaft 15 remain stationary. A rope or cable 35 may be passed around the winch 23 and extends upward over a suitable sheave 37 and down in a vertical line with the drill or plunger 5, to which the end may be attached for the purpose of raising said drill out of the well. We prefer to provide the shaft 39, on which the spool 9 is secured, with a worm-gear 41. A worm 43, supported in suitable housings 45, meshes with this gear, and a shaft 47, which imparts motion to the worm, preferably extends to the front of the machine, where it is supported in suitable bearings, and is provided with a suitable hand-wheel 49, by which the feeding device of the drill is operated.

The drilling operation is conducted in the following manner: The cable 7 is attached to the drill and passes over the sheave 3 and down around the crank-pulley 8 and back to the spool 9, to which it is secured and upon which the surplus is wound. The spool 9 is prevented from revolving by the worm-wheel 41 and the worm 43 of the feeding device, and this end of the cable is held in a fixed position. Power is now applied to the driving-shaft 29 and through it to the hollow shaft 17. The ratchet 22 engages the pawl 21, as shown in Fig. 1, and the shaft 15 and crank 11, carrying the pulley 8, are revolved with the said hollow shaft 17. This movement draws the loop in the cable formed around the crank-pulley 8 downward and raises the drill. When the crank 11 has been advanced in its downward course to a point beyond the center, as shown in Fig. 3, the pawl 21 will exert no more resistance against the ratchet-teeth and the weight of the drill will cause it to advance over the said teeth, the shaft 15 and its crank will be allowed to complete the revolution, and the drill will fall. The ratchet will still be in engagement with the pawl, and the crank will be immediately advanced and another revolution completed.

In machines of this class in common use it is necessary that the drill remain stationary after a single stroke until the main shaft revolves and brings the operating mechanism in contact with the trip for another movement of the drill.

In our device no time is lost, as the drill will be raised again immediately after it strikes, and we are enabled to make nearly two operations of the drill to one revolution of the shaft, for as the pulley 8 in the position shown in Fig. 3 passes the dead-center the arm is dragged around with great rapidity, the pawl 21 being carried ahead much faster than the ratchet revolves. Thus a number of teeth upon the ratchet are passed over each revolution, giving the pulley 8 upon the crank-arm a greater headway and speed than that of the ratchet. As the work progresses the drill may be fed downward by revolving the hand-wheel 49, which partially revolves the shaft 39 and the spool 9, secured upon said shaft. This allows the cable 7 to be uncoiled from the spool, lengthens the cable, and the drill sinks farther into the well. When it is necessary to remove the drill, the cable 7 is replaced by the cable 35, the lever 31 is forced downward, and the pawl 21, as it is brought uppermost by the revolution of the shaft, strikes against the said lever and is forced out of engagement with the ratchet. The drilling mechanism is thus stopped, while the winch 23 continues to revolve and wind the cable 35, which is usually loose upon the winch 23, but is now tightened thereon by pulling out upon the end of the rope hanging below the winch, thereby winding up the rope and raising the drill.

While we have described the crank as secured upon the shaft 15, that passes through the hollow shaft, it will be understood that any other method of securing this crank so as to permit it to drop forward after it passes the center and to be immediately engaged again by the ratchet-wheel will be the equivalent of the construction described and it may be used to secure the same result.

We claim as our invention—

1. In a well-drilling machine, the combination, with a driving-shaft 29, of the hollow shaft 17, the ratchet 22 on said shaft, the shaft 15, provided with the crank 11 and the pulley 8, over which the drill-cable passes, said shaft revolving concentrically with the shaft 17, the quadrant 19, secured to the shaft 15, and the ratchet 21, pivotally secured to the said quadrant and engaging the said ratchet 22, substantially as described.

2. In a well-drilling machine, the combination, with the driving-shaft 29 and the hollow shaft 17, of the winch 23, secured to the shaft 17 and provided with the ratchet 22, the shaft 15, revolving concentrically with the shaft 17 and carrying the raising mechanism, the pawl 21, suitably supported upon and revolving with the shaft 15, and a lever 31 in line with said pawl and capable of being brought in contact with the free end thereof for the purpose of throwing said pawl out of engagement with the ratchet, substantially as described.

In testimony whereof we have hereunto set our hands this 2d day of March, 1890.

AUGUST C. KRASSIN.
THOMAS BOUCHER.

In presence of—
JOHN MOONUN,
P. McLOONE.